A. N. LURIE.
SLIDE RULE.
APPLICATION FILED APR. 25, 1910.
1,028,237.
Patented June 4, 1912.
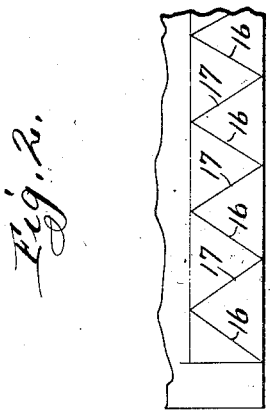
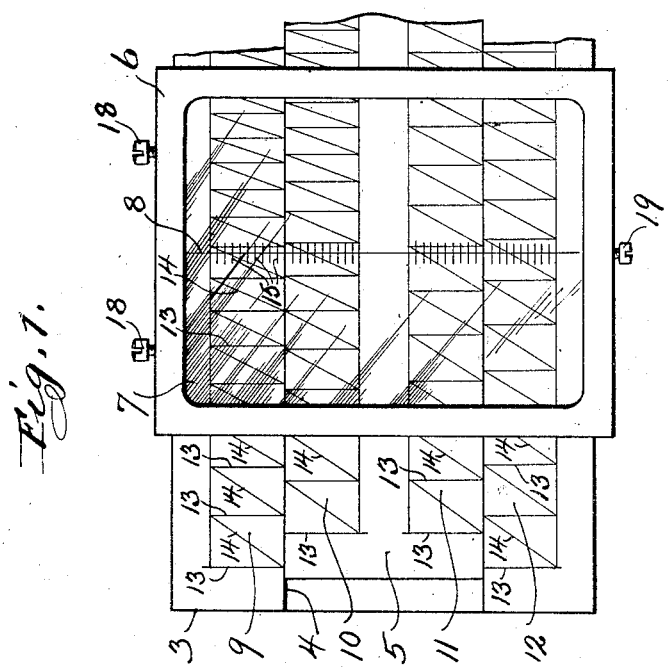
Witnesses:
Inventor:
Arnold N. Lurie

UNITED STATES PATENT OFFICE.

ARNOLD N. LURIE, OF CHICAGO, ILLINOIS, ASSIGNOR OF ONE-HALF TO THERESA L. LURIE, OF CHICAGO, ILLINOIS.

SLIDE-RULE.

1,028,237.   Specification of Letters Patent.   Patented June 4, 1912.

Application filed April 25, 1910. Serial No. 558,089.

*To all whom it may concern:*

Be it known that I, ARNOLD N. LURIE, a citizen of the United States, residing at Chicago, in the county of Cook and State of Illinois, have invented a new and useful Slide-Rule, of which the following is a specification.

My invention relates to slide rules provided with a runner carrying a hair line and the objects of my improvements are, first, to simplify the graduations on the scale; second, to enable more accurate reading on the scale; third, to make a cheaper and more desirable article and other features to become apparent from the description to follow.

In slide rules the hair line on the runner glass is used to determine the relative position of the graduations on the different portions of the rule, and as heretofore made the division lines on the sections of the rule were parallel to the hair line on the runner which made accurate reading very difficult or even impossible in certain parts of the rule.

By the use of my invention the number of graduation lines on the different sections of the rule are diminished and more accurate reading of the scale is afforded.

My invention consists of providing a slide rule with the necessary major perpendicular graduation lines and connecting these lines by inclined or diagonal lines and placing on the runner glass horizontal graduation lines to coöperate with the inclined and perpendicular lines. The construction may be modified by omitting the perpendicular lines, and each inclined or diagonal line may be made to represent a logarithmic line.

To describe my invention so that others versed in the art to which it pertains may make and use the same, I have illustrated it on the accompanying sheet of drawing forming a part of this specification in which:—

Figure 1, is a fragmentary face view of a slide rule embodying my invention and Fig. 2, is a detail view showing a modification.

Similar reference characters refer to similar parts throughout.

The rule comprises the body portion 3, provided with a central longitudinal groove 4, in which the slide 5 is mounted to slide longitudinally and the runner 6 is mounted to slide on the body portion 3 with its glass 7 provided with the hair line 8 arranged to lie close to the graduated surfaces of the rule 3 and slide 5.

The rule is provided with the graduated scales 9, 10, 11 and 12 generally known as scales A, B, C, and D, respectively, and since each one of these scales is arranged like the others in so far as the novelty of the invention is concerned I will proceed to describe one scale only. The major graduations are indicated by the vertical lines 13, *i. e.* taking the longitudinal axis of the rule as a horizontal line. The vertical lines 13 are all of the exact same length and a diagonal line 14 connects the lower end of each line 13 with the upper end of the next succeeding line 13. The hair line 8 on the runner 6 which is also perpendicular has a portion equal in length to the length of the lines 13 divided into an equal number of divisions, preferably ten indicated by the short horizontal lines 15.

As clearly seen in the drawing the lines 15 on the runner 6 coöperate with the diagonal lines 14 on the scale, and since the distance from one line 15 to another line 15 indicates a tenth of the whole, the operator by observing which line 15 crosses the inclined line 14 at the hair line 8, can readily read how many tenths to add to the amount indicated by the major line 13. For example, when the runner 6 and the slide 5 are in the position shown in Fig. 1, the hair line 8 is seven and nine tenths tenths the distance from the first line 13 to the left of same toward the first line 13 to the right of same on the scale 9; the hair line 8 is seven tenths the distance from the first line 13 to the left of same toward the first line 13 to the right of same on the scale 10; the hair line 8 is eight and four tenths tenths the distance from the first line 13 to the left of same toward the first line 13 to the right of same on scale 11 and the hair line 8 is six and seven tenths tenths the distance from the first line 13 to the left of same toward the first line 13 to the right of same on scale 12.

In Fig. 1, the diagonal lines 14 are all shown as inclined in the same direction but they may alternately be inclined in opposite directions without in the least departing from the spirit of my invention as shown in Fig. 2, where only the diagonal lines 16 and 17 are provided. The vertical lines are omitted but the apexes formed by the junction of two lines 16 and 17 indicate the major divisions on the scale.

To adjust the glass 7 in the runner 16 I provide the two set screws 18 at the top edge of the runner 6 and the one set screw 19 at the lower edge of the same to be screwed tightly against the edges of the glass 7.

Having thus fully described my invention what I claim as new and desire to secure by Letters Patent of the United States is:—

1. In a device of the class described, a scale having designated points along an upper line and a lower line to indicate the major divisions of said scale, diagonal lines connecting the designated points along the upper line with the designated points along the lower line, a runner to slide longitudinally along said scale and a vertical line on said runner divided into a plurality of equal divisions to coöperate with said diagonal lines.

2. In a slide rule, a scale having vertical lines of uniform length to indicate the major divisions of said scale, diagonal lines connecting the upper and lower ends of said vertical lines, a runner to slide longitudinally along said scale and a vertical line on said runner equal in length to the vertical lines of said scale and divided into a plurality of equal divisions.

In testimony whereof I have signed my name to this specification in presence of two subscribing witnesses this 14th day of August 1909 at Chicago, Illinois.

ARNOLD N. LURIE.

Witnesses:
R. J. JACKER,
WALTER A. WEISNER.